US 6,724,125 B2

(12) United States Patent
Hung et al.

(10) Patent No.: US 6,724,125 B2
(45) Date of Patent: Apr. 20, 2004

(54) METHODS AND APPARATUS FOR DIFFRACTIVE OPTICAL PROCESSING USING AN ACTUATABLE STRUCTURE (75) Inventors: Elmer S. Hung, San Diego, CA (US); Erik R. Deutsch, Cambridge, MA (US); Stephen D. Senturia, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 48 days.

(21) Appl. No.: 10/090,380

(22) Filed: Mar. 4, 2002

(65) Prior Publication Data

US 2002/0167245 A1 Nov. 14, 2002

Related U.S. Application Data (63) Continuation-in-part of application No. 10/015,732, filed on Dec. 10, 2001, which is a continuation of application No. 09/537,936, filed on Mar. 29, 2000, now Pat. No. 6,329,738.
(60) Provisional application No. 60/272,946, filed on Mar. 2, 2001, and provisional application No. 60/126,844, filed on Mar. 30, 1999.

(51) Int. Cl.[7] .................................................. H03H 9/70
(52) U.S. Cl. ..................................................... 310/309
(58) Field of Search .......................... 310/309; 359/224

(56) References Cited

U.S. PATENT DOCUMENTS

| 3,553,364 A | | 1/1971 | Lee |
| 4,234,788 A | | 11/1980 | Palmer et al. |
| 4,252,697 A | | 2/1981 | Hashizume et al. |
| 4,731,670 A | * | 3/1988 | Allen et al. ................ 347/240 |
| 4,805,038 A | | 2/1989 | Seligson |

(List continued on next page.)

FOREIGN PATENT DOCUMENTS

| EP | 1 014 143 A1 | 6/2000 |
| EP | 1 122 577 A2 | 8/2001 |
| EP | 1 143 287 A2 | 10/2001 |
| WO | WO 91/02991 A1 | 3/1991 |
| WO | WO 98/41893 A1 | 9/1998 |
| WO | WO 01/11394 A1 | 2/2001 |
| WO | WO 01/11396 A1 | 2/2001 |
| WO | WO 01/11410 A1 | 2/2001 |
| WO | WO 01/11419 A2 | 2/2001 |
| WO | WO 01/42825 A1 | 6/2001 |

OTHER PUBLICATIONS

*Micromechanical Light Modulator Array Fabricated on Silicon*, K.E. Petersen, IBM Research Lab., Applied Physics Letters, vol. 31, No. 8, Oct. 15, 1977, pp. 521–523.
*Miniature Fabry–Perot Interferometers Micromachined in Silicon for Use in Optical Fiber WDM Systems*, J.H. Jerman et al., IEEE 1991 372, International Conf. on Solid–State Sensors and Actuators 1991, pp. 372–375.

(List continued on next page.)

*Primary Examiner*—Thomas M. Dougherty
*Assistant Examiner*—Karen Addison
(74) *Attorney, Agent, or Firm*—Lowrie, Lando & Anastasi, LLP (57) ABSTRACT

A method of redirecting light using an actuatable two-layer diffraction grating structure, the method having applications in wavelength-division multiplexed systems. An optical add/drop modulator (OADM) including an actuatable diffraction grating, for use with a wavelength-division multiplexed signal. An OADM having an optical source located off the main pathway to direct a optical carrier to be added onto the actuatable diffraction grating such that the carrier is diffracted into the main pathway. A detector to measure signal strength for use with an optical processor, the optical processor having an actuatable structure having gaps between the actuated portion of the structure. The detector detecting the portions of light diffracted by the gaps.

17 Claims, 7 Drawing Sheets

U.S. PATENT DOCUMENTS

| | | |
|---|---|---|
| 5,022,745 A | 6/1991 | Zayhowski et al. |
| 5,115,344 A * | 5/1992 | Jaskie .................. 359/573 |
| 5,164,688 A | 11/1992 | Larson |
| 5,168,249 A | 12/1992 | Larson |
| 5,175,521 A | 12/1992 | Larson |
| 5,202,786 A | 4/1993 | Nelson |
| 5,206,557 A | 4/1993 | Bobbio |
| 5,212,582 A * | 5/1993 | Nelson .................. 359/224 |
| 5,233,456 A | 8/1993 | Nelson |
| 5,291,502 A | 3/1994 | Pezeshki et al. |
| 5,311,360 A | 5/1994 | Bloom et al. |
| 5,353,641 A | 10/1994 | Tang |
| 5,392,151 A * | 2/1995 | Nelson .................. 359/223 |
| 5,396,066 A | 3/1995 | Ikeda et al. |
| 5,459,610 A | 10/1995 | Bloom et al. |
| 5,561,523 A | 10/1996 | Blomberg et al. |
| 5,629,951 A | 5/1997 | Chang-Hasnain et al. |
| 5,640,133 A | 6/1997 | MacDonald et al. |
| 5,646,772 A | 7/1997 | Yurke |
| 5,654,819 A | 8/1997 | Goossen et al. |
| 5,661,592 A | 8/1997 | Bornstein et al. |
| 5,677,783 A | 10/1997 | Bloom et al. |
| 5,696,662 A | 12/1997 | Bauhahn |
| 5,739,945 A | 4/1998 | Tayebati |
| 5,745,271 A | 4/1998 | Ford et al. |
| 5,757,536 A * | 5/1998 | Ricco et al. ............. 359/224 |
| 5,781,670 A | 7/1998 | Deacon et al. |
| 5,794,023 A | 8/1998 | Hobbs et al. |
| 5,808,797 A | 9/1998 | Bloom et al. |
| 5,836,203 A | 11/1998 | Martin et al. |
| 5,841,579 A | 11/1998 | Bloom et al. |
| 5,847,859 A | 12/1998 | Murata |
| 5,870,221 A | 2/1999 | Goossen |
| 5,905,571 A | 5/1999 | Butler et al. |
| 5,905,589 A | 5/1999 | Tanaka et al. |
| 5,920,418 A | 7/1999 | Shiono et al. |
| 5,933,277 A | 8/1999 | Troxell et al. |
| 5,949,568 A | 9/1999 | Koo et al. |
| 5,949,570 A | 9/1999 | Shiono et al. |
| 5,953,161 A | 9/1999 | Troxell et al. |
| 5,966,235 A | 10/1999 | Walker |
| 5,969,848 A | 10/1999 | Lee et al. |
| 5,978,127 A | 11/1999 | Berg |
| 5,991,079 A | 11/1999 | Furlani et al. |
| 5,998,906 A | 12/1999 | Jerman et al. |
| 5,999,319 A | 12/1999 | Castracane |
| 6,004,912 A | 12/1999 | Gudeman |
| 6,014,257 A | 1/2000 | Furlani et al. |
| 6,031,652 A | 2/2000 | Furlani et al. |
| 6,038,057 A | 3/2000 | Brazas, Jr. et al. |
| 6,061,166 A | 5/2000 | Furlani et al. |
| 6,067,183 A | 5/2000 | Furlani et al. |
| 6,072,620 A | 6/2000 | Shiono et al. |
| 6,088,148 A | 7/2000 | Furlani et al. |
| 6,108,117 A | 8/2000 | Furlani et al. |
| 6,130,770 A | 10/2000 | Bloom |
| 6,141,139 A | 10/2000 | Furlani et al. |
| 6,144,481 A | 11/2000 | Kowarz et al. |
| 6,169,624 B1 | 1/2001 | Godil et al. |
| 6,172,796 B1 | 1/2001 | Kowarz et al. |
| 6,175,443 B1 | 1/2001 | Aksyuk et al. |
| 6,181,458 B1 | 1/2001 | Brazas, Jr. et al. |
| 6,188,519 B1 | 2/2001 | Johnson |
| 6,215,579 B1 | 4/2001 | Bloom et al. |
| 6,233,087 B1 | 5/2001 | Hawkins et al. |
| 6,238,581 B1 | 5/2001 | Hawkins et al. |
| 6,243,194 B1 | 6/2001 | Brazas, Jr. et al. |
| 6,251,842 B1 | 6/2001 | Gudeman |
| 6,252,697 B1 | 6/2001 | Hawkins et al. |
| 6,268,952 B1 | 7/2001 | Godil et al. |
| 6,282,012 B1 | 8/2001 | Kowarz et al. |
| 6,282,213 B1 | 8/2001 | Gutin et al. |
| 6,284,560 B1 | 9/2001 | Jech, Jr. et al. |
| 6,288,824 B1 | 9/2001 | Kastalsky |
| 6,329,738 B1 | 12/2001 | Hung et al. |
| 6,625,342 B2 * | 9/2003 | Staple et al. ............... 385/18 |
| 6,636,658 B2 * | 10/2003 | Goodman et al. ........... 385/24 |

OTHER PUBLICATIONS

Solgaard et al. "Deformable grating Optical modulator," *Optics Letters*, vol. 17, No. 9, May 1, 1992, pp. 688–690.

Goossen et al., "Silicon Modulator Based on Mechanically–Active Anti–Reflection Layer with I Mbit/sec Capability for Fiber–in–the–Loop Applications," *IEEE Photonics Technology Letters*, vol. 6, No. 9, Sep. 1994, pp. 1119–1121.

*Spectrally Selective Gas Cell for Electrooptical Infrared Compact MultiGas Sensor*, Meléndez et al., Elsevier Science S.A., Sensors and Actuators 46–47 (1995) 417–421.

*Silicon Micromachined Infrared Sensor Wiht Tunable Wavelength Selectivity for Application in Infrared Spectroscopy*, D. Rossberg., Elsevier Science S.A., Sensors and Actuators 46–47 (1995) 413–416.

*Continuous–Membrane Surface–Micromachined Silicon Deformable Mirror*, Bifano et al., Soc. of Photo–Optical Ins. Eng. Opt. Eng. 36(5) May 1997, pp. 1354–1360.

*Mocro–Actuated Mirrors for Beam Steering*, Gustafson et al., SPIE–Society of Photo–Optical Instrumentation Engineering, vol. 3008, 1997, pp. 90–99.

*Designs to Improve Polysilicon Micromirror Surface Topology*, Burns et al., SPIE–Society of Photo–Optical Instrumentation Engineering, vol. 3008, 1997, pp. 100–110.

*Optical Beam Steering using Surface Micromachned Gratings and Optical Phased Arrays*, Burns et al., SPIE, vol. 3131, 1997, pp. 99–110.

*Investigation of the Maximum Optical Power Rating for a Micro–Electro–Mechanical Device*, Burns et al., Internat'l Conf. On Solid–State Sensors and Actuators Jun. 16, 1997–Jun. 19, 1997, pp. 335–338.

*Nonlinear Flexures for Stabel Deflection of an Electrostatically Actuated MicroMirror*, Burns et al., Air Force Institute of Technology, Dept. of Ele and Comp Eng., Wright–Patterson AFB, Ohio, SPIE vol. 3226, 1997, pp. 125–136.

*Synthetic Specra: A Tool for Correlation Spectroscopy*, Sinclair et al., Applied Optics, vol. 36, No. 15 May 20, 1997, pp. 3342–3348.

*Synthetic Infrared Specra*, Sinclair et al., Optical Society of America, Optical Letters, vol. 22, No. 13 Jul. 1, 1997, pp. 1036–1038.

*Electrostatic Effects in Micromachined Actuators for Adaptive Optics*, Horenstein, et al., Dept. of Aerospace and Mech. Eng. BU, Boston, MA, J. of Electrostatics, pp. 69–81 (1997).

*Analysis of Grating Light Valves with Partial Surface Electrodes*, Furlani et al., J. Appl. Phys. 83 (2), Jan. 15, 1998, American Institute of Physics, pp. 629–634.

*Positioning, Control and Dynamics of Electrostatic Actuators for use in Optical and RF Systems*, E.S. Hung, Aug. 21, 1998 thesis Massachusetts Institute of Technology, 107 pages.

*Optical Phase Modulation Using a Refractive Lenslet Array and Microelectromechanical Deformable Mirror*, Cowan et al., AFRL/MLP, Optical Engineering, vol. 37 No. 12, 12/123/98, pp. 3237–3247.

*Leveraged Bending for Full–Gap Positioning with electrostatic Actuation*, E.S. Hung et al. MIT, Solid–State Sensor and Actuator Workshop Hilton Head Island, SC Jun. 8, 1998–Jun. 11, 1998 pp. 83–86.

*MEMS Deformable Mirrors for Adaptive Optics*, Bifano, et al., Dept. of Aerospace and Mech. Eng., BU, Boston, MA, Solid–State Sensor and Actuator Workshop Hilton Head Island, SC Jun. 8, 1998–Jun. 11, 1998 pp. 71–74.

*Development of Microelectromechanical Variable Blaze Gratings*, Burns et al., Elsevier Science S.A. Conf. on Solid–State Sensors and Actuators, 1998, pp. 7–15.

*Optical Power Induced Damage to Microelectromechanical Mirrors*, Burns et al., Elsevier Science S.A. Conf. On Solid–State Sensors and Actuators, Sensors and Actuators A 70 (1998), pp. 6–14.

*Micromechanical Fiber–Optic Attenuator with 3 μ Response*, Ford et al., IEEE, J. of Lightwave Technology, vol., 16, No. 9 Sep. 1998 pp. 1663–1670.

*The Polychromator: A MEMS Correlation Spectrometer*, Hung et al., Microsystems Technology Laboratories Annual Report 1998.

*MEMS: Research and Applications in Microelectromechanical Systems*, Hung et al., Poster Session Guidebook, Mar. 31, 1998, pp. 1 and 4.

Ford et al., "Dynamic Spectral Power Equalization Using Micro–Opto–Mechanics," *IEEE Photonics Technology Letters*, vol. 10, Oct. 1998, pp. 1440–1442.

*Simulating Electrostrictive Deformable Mirrors: I Nonlinear Dynamic Analysis*, HOM et al., Lockheed Martin Missiles and Space, Smart Mater. Struct. 8, (1999), Jul. 26, 1999.

*Simulating Electrostrictive Deformable Mirrors: II Nonlinear Dynamic Analysis*, HOM, Lockheed Martin Missiles and Space, Smart Mater. Struct. 8, (1999), Jul. 26, 1999.

*Polymeric Tunable Optical Attenuator with an Optical Monitoring Tap for WDM Transmission Network*, Lee et al., IEEE Photonics Tech. Ltrs, vol. 11, No. 5, May. 1999, pp. 590–592.

*Modeling, Design, Fabrication and Measurement of a Single Layer Polysilicon Micromirror with Initial Curvature Compensation*, Min et al., Elsevier Science S.A., Sensors and Actuators 78 (1999) 8–17.

*Real Time Optical Correction Using Electrostatically Actuated MEMS Devices*, Horenstein, et al., Dept. of Aerospace and Mech. Eng., BU, Boston, MA, J. of Electrostatics, 1999, pp. 69–81.

*Surface Micromachined Segmented Mirrors for Adaptive Optics*, Cowan et al., IEEE J. of Selected Topics in Quantum Electronics, vol. 5 No. 1, Jan./Feb. 1999, pp. 90–101.

*Microelectromechanical Deformable Mirrors*, Bifano et al., IEEE J. of Selected Topics in Quantum Electronics, vol. 5, No. 1, Jan./Feb. 1999, pp. 83–89.

*Design and Fabrication of 10X10 Micro–Spatial Light Modulator Array for Phase and Amplitude Modulation*, Chung et al., Sensors and Actuators 78, Elsevier Science S.A., 1999, pp. 63–70.

*A Design–Based Approach to Planarization in Multilayer Surface Micromachining*, Mali et al., Dept. of Aerospace and Mech. Eng., BU, Boston, MA, Micromech. Microeng. 9 (1999) pp. 294–299.

*Variable Gratings for Optical Switching: Rigorous Electromagnetic Simulation and Design*, Gani et al., Opt. Eng. 38(3) 552–557, (Mar. 1999) Soc. of Photo–Optical Ins. Eng. pp. 552–557.

*Differential Capacitive Position Sensor for Planar MEMS Structgures with Vertical Motion*, Horenstein, et al., Dept. of Aerospace and Mech. Eng., BU, Boston, MA, Elsevier Science S.A. Jul. 12, 1999, pp. 53–61.

*Extending the Travel Range of Analog–Tuned Electrostatic Actuators*, Hung et al., IEEE J. of Microelectromechanical Systems, vol. 8, No. 4, Dec. 1999, pp. 497–505.

*Adaptive Control of a Micromachined Continuous–Membrane Deformable Mirror for Aberration Compensation*, Zhu et al., Applied Optics, vol. 38, No. 1, Jan. 1, 1999, pp. 168–176.

*Development of Microelectromechanical Deformable Mirrors for Phase Modulation of Light*, Mali et al., Dept. of Aerospace and Mech. Eng., BU, Boston, MA, pp. 542–548.

*Micro–Electro–Mechanical Variable Balze Gratings*, Burns et al., Air Force Institute of Technology, Dept. of Ele and Comp Eng., Wright–Patterson AFB, Ohio, pp. 55–60.

Copending patent application Ser. No. 09/975,169, filed on Oct. 11, 2001 by Deutsch et al.

Copending patent application Ser. No. 10/090,381, filed Mar. 4, 2002 by Stephen D. Senturia.

Copending patent application Ser. No. 10/015,732, filed on Dec. 10, 2001.

\* cited by examiner

METHODS AND APPARATUS FOR DIFFRACTIVE OPTICAL PROCESSING USING AN ACTUATABLE STRUCTURE

CROSS REFERENCE TO RELATED APPLICATIONS

This application claims the benefit of U.S. Provisional Application No. 60/272,946 filed Mar. 2,2001, entitled "METHODS AND APPARATUS FOR WAVELENGTH-BASED OPTICAL PROCESSING," by Senturia. This application is also a continuation-in-part of U.S. patent application Ser. No. 10/015,732, entitled "ELECTROSTATICALLY-CONTROLLABLE DIFFRACTION GRATING," filed on Dec. 10, 2001, which in turn is a continuation of U.S. non-provisional application Ser. No. 09/537,936, entitled "PRECISION ELECTROSTATIC ACTUATION AND POSITIONING," by Hung et al., filed Mar. 29, 2000, now issued as U.S. Pat. No. 6,329,738 B1, entitled "PRECISION ELECTROSTATIC ACTUATION AND POSITIONING," by Hung et al., which in turn claims the benefit of U.S. Provisional Application No. 60/126,844, entitled "PRECISION ELECTROSTATIC ACTUATION AND POSITION CONTROL," filed Mar. 30, 1999. The entirety of each of the above is hereby incorporated by reference.

STATEMENT REGARDING FEDERALLY SPONSORED R&D

This invention was made with Government support under Contract Nos. N66001-97-8620 and J-FBI-95-215, both awarded by the Defense Advanced Research Project Agency. The Government may have certain rights in the invention.

FIELD OF THE INVENTION

The present invention generally relates to optical processing using an actuatable structure and, more particularly, to methods and apparatus that facilitate a variety of optical processing functions using a diffractive actuatable optical processor.

DISCUSSION OF THE RELATED ART

Microelectromechanical systems (MEMS) are being employed in an increasing range of applications. The desirability of employing MEMS arises in part because of the ability to batch fabricate such microscale systems with a variety of highly complex features and functionality. Optical processing is one area where MEMS have been used in an increasing number of applications. In particular, MEMS have been used to modulate the intensity of light.

One method of achieving optical modulation using MEMS is by diffractive optical processing. As is conventionally known, the process of diffraction refers to a change in direction and/or intensity of radiation of a given wavelength after the radiation impinges upon a diffracting element (e.g., a reflective diffraction grating).

The process of diffraction results in a number of "orders" of diffracted radiation, wherein each order is diffracted at a particular angle and has a particular intensity, based in part on the wavelength of the radiation and various physical properties of the diffracting element. The mathematical relationships governing the process of diffraction are well-known and may be found in a variety of optics texts, for example.

Figure 1A:
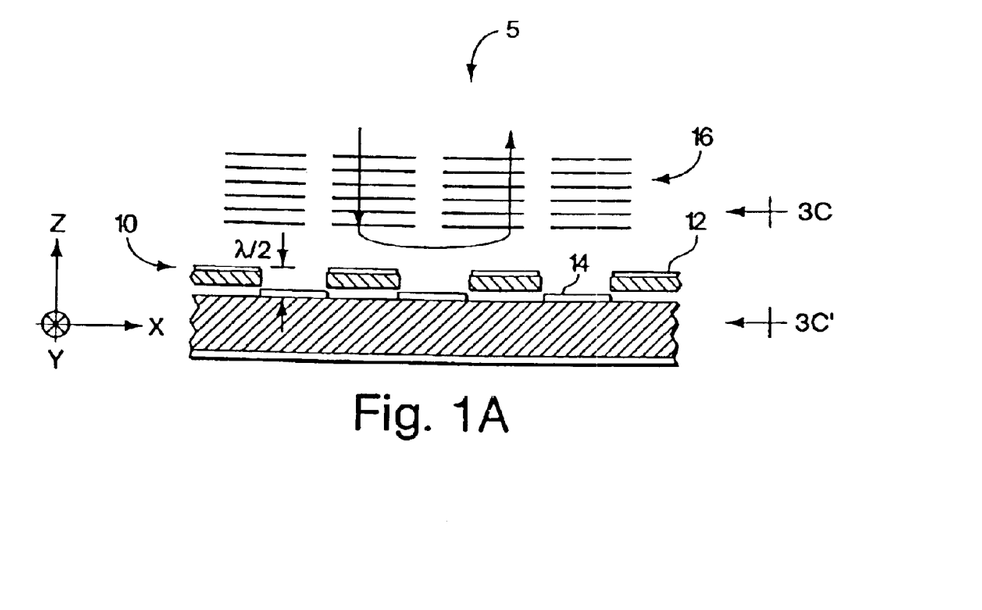
FIGS. 1A–1B are side views of a conventional MEMs diffractive processor illustrating principals of MEMS-based optical processing.
Figure 1B:
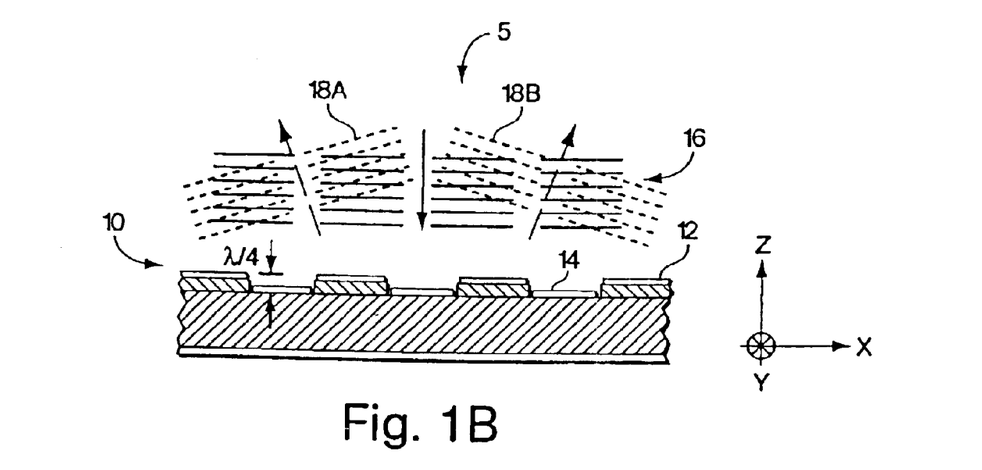

FIGS. 1A and 1B are side views of a conventional MEMS diffractive processor 5 illustrating principles of MEMS-based optical processing. In FIG. 1A, a grating 10 is illustrated having upper grating elements 12 and lower grating elements 14. The separation between upper grating elements 12 and lower grating elements 14, as measured along the path of incoming beam 16, is equal to one-half of the wavelength of incoming beam 16. Accordingly, grating 10 acts to reflect incoming beam 16 to generate an output beam along the path of incoming beam 16.

In FIG. 1B, grating structure 10 is actuated using any known MEMS method of actuation (e.g., upper grating element 12 is displaced downward by electrostatic actuation) to achieve a desired separation between upper grating elements 12 and lower grating elements 14. In FIG. 1B the separation, as measured along the path of incoming beam 16, is equal to one-quarter of the wavelength of incoming beam 16. Accordingly, grating 10 acts to reflect and diffract incoming beam 16 to form output beams 18, corresponding to a first order 18A and a negative first order 18B of diffraction.

Figure 1C:
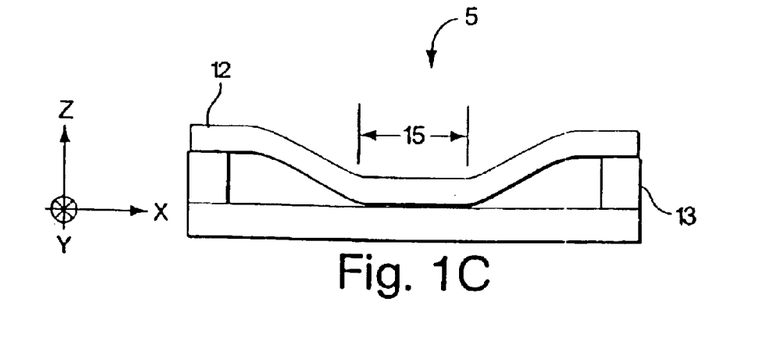
FIG. 1C is a cross-sectional side view of conventional MEMS optical processor taken along lines 3C-3C' of FIG. 1A.

FIG. 1C is a cross-sectional side view of conventional MEMS optical processor 5 taken along lines 3C—3C of FIG. 1A. FIG. 1C illustrates an exemplary one of upper grating elements 12, where the ends of upper grating element 12 are fixed to a frame 13. For efficient operation of a grating (e.g., grating 10 of FIGS. 1A and 1B), upon actuation, the separation between upper grating elements 12 and lower grating elements 14 (visible in FIG. 1B above) should be a known and fixed value to allow controlled diffraction of an incoming beam; however, conventional grating structures have had limited success in achieving controlled diffraction because actuatable upper grating elements 12 are fixed at the ends, and are otherwise free-standing. Accordingly, grating elements 12 only achieve a desired separation at a limited region 15 of grating element 12. As a result, conventional MEMS diffractive optical processors have performance issues related to the loss of efficiency arising from the inability to adequately control the MEMS grating structure.

Some additional performance issues relevant to MEMS structures are speed of operation, range of actuation, and physical size of the spatial light modulator. Conventional spatial light modulators suffer from a variety of shortcomings in connection with at least some of the above performance issues. Thus, needs exist for actuatable optical processors having improved control of actuation of grating elements.

SUMMARY OF THE INVENTION

Some aspects of the present invention are directed to actuatable optical processors having improved control of separation of grating elements by using a support structure including an actuation beam to support at least one grating element. Some embodiments of the above aspect of the invention are directed to optical processors for use in optical communications functions. Still other aspects of the present invention are directed to increased functionality of optical communications systems that use actuatable optical processors.

For purposes of the present disclosure, the term "wavelength band" refers to a continuous wavelength spectrum over a particular range of wavelengths (e.g., the optical communications "C" band from 1525 to 1570 nanometers, or the "L" band from 1570–1610 nanometers). Similarly, the term "sub-band" as used herein refers to a fraction of a specified wavelength band, and the term "channel" as used herein refers to a specific relatively narrow sub-band having an optical carrier at a particular wavelength that is modulated to carry information. Accordingly, it should be appreciated that a sub-band (as well as a band) of wavelengths may include one or more channels.

In view of the foregoing, for purposes of the present disclosure, an "optical signal" refers to a signal comprising one or more channels designated by optical carriers having wavelengths in a range of from approximately 0.2 micrometers to 20 micrometers (i.e., from the ultraviolet through the infrared regions of the electromagnetic spectrum). Optical signals including optical carriers corresponding to several channels are commonly referred to as wavelength division multiplexed (WDM) signals. The phrase "optical carrier" as used herein means any information-bearing light beam, independent of any selected modulation scheme.

In some conventional optical communications applications, optical carriers of two or more channels of a given optical signal may be processed differently based on the wavelengths of the carriers. One example of conventional wavelength-based processing of optical signals is referred to as variable optical attenuation, which relates to a controlled attenuation of optical signals across a particular wavelength band (or sub-band). A device that performs this type of function accordingly is referred to as a "Variable Optical Attenuator," or "VOA." For purposes of the present disclosure, the abbreviation VOA is used to refer either to the variable optical attenuation function or a device that performs such a function. In VOA, typically optical carriers corresponding to channels lying in a particular wavelength band or sub-band are uniformly attenuated.

Another example of conventional wavelength-based processing is referred to as gain-equalization filtration, and a device that performs this type of function accordingly is referred to as a "Gain-Equalization Filter," or "GEF." As above, for purposes of the present disclosure, the abbreviation GEF is used to refer either to the gain-equalization filtration function or a device that performs such a function. In GEF, the attenuation of one or more particular optical carriers corresponding to channels of an optical signal within a particular wavelength band or sub-band is controlled, so as to compensate for wavelength-dependent gain variations of an optical amplifier through which the optical signal passes (e.g., an erbium-doped fiber amplifier).

Yet another example of conventional wavelength-based processing is referred to as optical add/drop multiplexing, and a device that performs this type of function accordingly is referred to as an "Optical Add/Drop Multiplexer," or "OADM." As above, for purposes of the present disclosure, the abbreviation OADM is used to refer either to the optical add/drop multiplexing function or a device that performs such a function. In OADM, an optical carrier corresponding to a particular channel of an optical signal is added or removed (dropped) in a controlled manner (also referred to as channel dropping). Often, optical signals processed by an OADM may contain several other channels closely spaced in wavelength with respect to the targeted optical carrier to be added or dropped.

According to some aspects of the invention, a wavelength-division multiplexed (WDM) optical signal (i.e., an optical signal having two or more communication channels) is processed so as to spatially separate optical carriers corresponding to different wavelength bands present in the signal, and the spatially-separated carriers then are individually and selectively diffracted. In particular, according to some aspects of the invention, each wavelength band of the optical signal is capable of being independently and variably diffracted. The different wavelength bands each may contain one or more channels each having an optical carrier.

According to additional aspects of the present invention, an optical signal is spatially separated into different wavelength bands and the wavelength bands are individually and selectively diffracted, and the respective zeroth-orders of the diffracted wavelength bands are spatially combined to produce a single processed optical signal. As conventionally known, with respect to a transmission diffracting element, a "zeroth-order" of a diffracted wavelength of radiation refers to diffracted radiation whose direction of propagation is essentially parallel to (and in the same direction as) the radiation impinging on the transmission diffracting element (i.e., the zeroth-order radiation is essentially undeflected by the transmission diffracting element). With respect to an unblazed reflection diffracting element, the zeroth-order refers to diffracted radiation having a diffraction angle that is essentially equal to an angle of incidence of the radiation impinging on the reflection diffracting element, with respect to a normal to a surface of the diffracting element (i.e., the angle of incidence and the angle of diffraction are equal). The zeroth-order diffracted radiation from an unblazed reflection diffracting element also is commonly referred to as a "specular reflection" (i.e., as if from a plane mirror).

In view of the foregoing, one aspect of the present invention is a method of redirecting light of a wavelength from a main pathway using a diffractive optical element having a plurality of reflective grating elements, and a plurality of actuating beams. Each of the plurality of actuating beams of the diffractive optical element are supported over a substrate and support a corresponding one the grating elements over the substrate to form a corresponding auxiliary gap. The plurality of actuating beams and the plurality of grating elements are configured such that a displacement of at least one of the plurality of actuating beams toward the substrate causes the corresponding one of the reflective grating elements to be displaced toward the substrate. The method comprises directing a beam of light along the main pathway and onto the plurality of grating elements, the beam having at least light of a first wavelength and light of a second wavelength, and positioning at least one of the actuating beams relative to the substrate to cause at least a portion of one of the light of a first wavelength and the light of a second wavelength to be diffracted out of the main pathway.

In some embodiment of the first aspect of the invention, the light of a first wavelength is from a source having a plurality of wavelengths directed along the main pathway. Optionally, the method of the first aspect may further comprise spatially separating the light of a first wavelength and the light of a second wavelength prior to directing the beam of light onto the plurality of grating elements. The light of a first wavelength may be an optical carrier in a DWDM signal, and the least one optical carrier may be dropped. Optionally, the at least one of the optical carriers is assymetrically diffracted. In some embodiments of the first aspect of the invention, the method is used to block optical carriers in an OADM multiplexer system. Alternatively, the method may be used to block an empty channel of the wavelength-division multiplexed signal.

A second aspect of the invention is a method of processing at least one optical carrier of a wavelength-division multiplexed signal using a diffracting optical element, the diffracting optical element having a plurality of reflective grating elements, and a plurality of actuating beams. Each of the plurality of actuating beams of the diffractive optical element are supported over the substrate and support a corresponding one the grating elements over the substrate to form an auxiliary gap. The plurality of actuating beams and the plurality of grating elements are configured such that a displacement of at least one of the plurality of actuating beams toward the substrate causes the corresponding one of the reflective grating elements to be displaced toward the substrate. The method comprises directing the at least one optical carrier along a main pathway, and onto the plurality of grating elements, and positioning at least one of the plurality of actuating beams to modify the optical strength along the main pathway of the at least one optical carrier.

Optionally, the method of the second aspect may further comprise spatially separating the light of a first wavelength and the light of a second wavelength prior to the directing the beam of light onto the plurality of grating elements. The modification may be that the at least one optical carrier is dropped. Optionally, the at least one of the optical carriers is assymetrically diffracted. The method may be used to block optical carriers in an OADM multiplexer system. Alternatively, the method may be used to block an empty channel of the wavelength-division multiplexed signal.

Following below are more detailed descriptions of various concepts related to, and embodiments of, methods and apparatus for wavelength-based optical processing. It should be appreciated that various aspects of the invention as discussed above and outlined further below may be implemented in any of numerous ways, as the invention is not limited to any particular manner of implementation. Examples of specific implementations are provided for illustrative purposes only.

DESCRIPTION OF THE INVENTION

Figure 2:
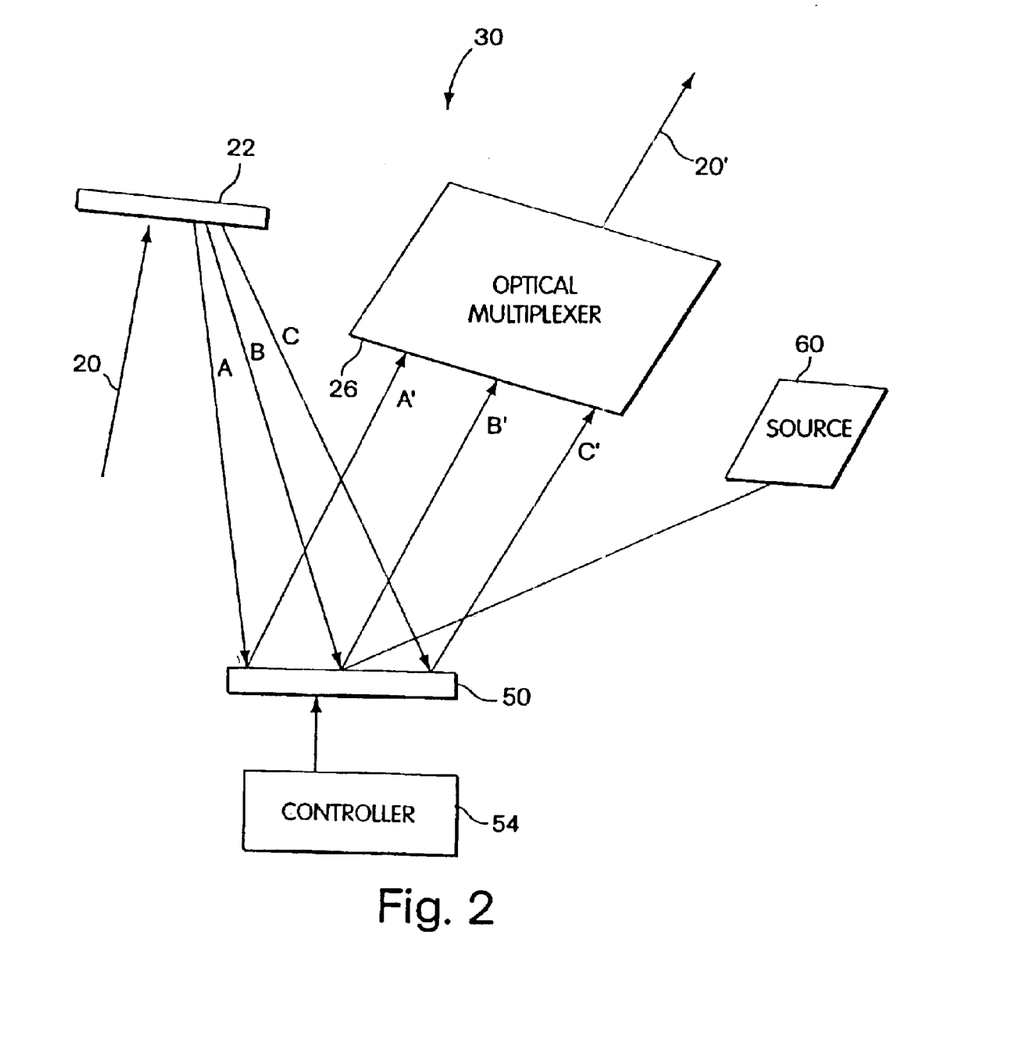
FIG. 2 is a diagram illustrating an optical signal processing apparatus illustrating one aspect of the invention.

FIG. 2 is a diagram of an optical processing apparatus 30 (also referred to as an optical processor) illustrating aspects of the present invention. In FIG. 2, an optical signal 20 (e.g., from an input optical fiber (not shown) to the apparatus 30) having a number of optical carriers (i.e., signal 20 is a WDM signal) is directed to an optical demultiplexer 22. The optical demultiplexer 22 may include one or more optical elements to spatially separate different wavelengths of the optical signal 20. In one aspect of this embodiment, a fixed transmission or reflection diffraction grating may be employed as the optical demultiplexer 22 (e.g., FIG. 2 illustrates a reflective element for the optical demultiplexer), although it should be appreciated that the invention is not limited in this respect; namely, other types of conventional optical elements may be used for the optical demultiplexer 22.

In one aspect of the invention, the purpose of the demultiplexer 22 is to achieve spatial separation of the optical carriers corresponding to tightly-spaced optical channels within the wavelength-division multiplexed (WDM) optical signal 20. In another aspect, the demultiplexer 22 may provide spatial separation of different wavelength bands or sub-bands of the optical signal 20, wherein each band or sub-band includes one or more optical carriers each corresponding to a different channel. In this aspect, it should be appreciated that although different wavelength bands or sub-bands generally include different channels, in some cases the bands or sub-bands may overlap to some extent; specifically, in some cases, two neighboring wavelength bands or sub-bands may include one or more identical channels, along with other channels that are not included in both bands.

In FIG. 2, the degree of spatial separation provided by the demultiplexer 22 relates to an overall resolution of the optical processing apparatus 30, which may be determined by various design parameters discussed further below. Hence, it should be appreciated that according to one aspect of the invention, the spatial separation provided by the demultiplexer 22 is a matter of design choice, and the invention is not limited to any particular implementation of the demultiplexer 22. Accordingly, in one aspect, the optical processing apparatus 30 may be specifically tailored to accommodate a variety of optical processing applications, based at least in part on the optical signals to be processed.

For purposes of the following discussion, the demultiplexer 22 shown in FIG. 2 is shown as separating the optical signal 20 into three spatially-distinct optical carriers A, B, and C having different wavelengths (i.e., corresponding to different channels). In other embodiments, as discussed above, it should be understood that the separated constituents A, B, and C of the optical signal 20 shown in FIG. 2 alternatively may correspond to different wavelength bands or sub-bands of the optical signal. Of course, it should also be appreciated that the depiction of three different optical carriers (or wavelength bands) in FIG. 2 is for purposes of illustration only, and that the invention is not limited in this respect; namely, any number of optical carriers (or wavelength bands) may be included in the optical signal 20 and spatially separated by the optical demultiplexer 22 at various resolutions.

In FIG. 2, the three spatially-separated optical carriers A, B, and C are directed onto the operational surface of a diffractive optical element 50. Although the operational surface of diffractive optical element 50 is understood to be comprised of a plurality of grating elements which do not form a planar or continuous surface, the term "surface" will be used herein to refer to the plurality of grating elements. As described in greater detail with reference to FIGS. 3A, 5A–B, and 6A–B below, according to some aspects of the invention, diffractive optical element 50 may be a diffractive optical processor having grating elements supported by actuating beams.

FIG. 2 also shows the corresponding zeroth-order (i.e., specular reflection) for each optical carrier diffracted by the diffracting optical element 50 as A', B', and C'. The zeroth-orders of the diffracted optical carriers are directed, in turn, to an optical multiplexer 26 which recombines the diffracted optical carriers into a single processed optical signal 20' (so that the processed signal can be directed into an optical fiber, for example). Like the optical demultiplexer 22, the optical multiplexer 26 may include one or more various conventional optical components (e.g., one or more lenses) for focussing the zeroth-orders A', B', and C' of the diffracted optical carriers. For purposes of the following discussion, the path of the optical signal 20 through the optical processing apparatus 30 in FIG. 2, including the separated constituents A, B, and C and the zeroth-orders A', B', and C' of the diffracted optical carriers, is referred to as the "main pathway" through the apparatus.

FIG. 2 also shows that, according to one aspect of the invention, the optical processing apparatus 30 includes a controller 54 coupled to the diffracting optical element 50. According to this aspect, the controller 54 is employed to control the diffracting optical element 50 so as to individually and selectively diffract each of the optical carriers A, B, and C impinging on the diffracting optical element 50. In one aspect of this embodiment, the controller 54 and the diffracting optical element 50 are capable of simultaneously controlling the diffraction of each of the optical carriers A, B, and C, wherein each channel may be differently diffracted. The controller 54, as well as one embodiment of the diffracting optical element 50, are discussed in greater detail further below in connection with FIGS. 3 and 4. According to some aspects of the invention, in order to implement the VOA or GEF optical processing functions discussed above, the diffracting optical element 50 is actuated by the controller 54 so as to independently and variably control the main pathway (i.e., zeroth-order) intensity of the various optical carriers.

Figure 3A:
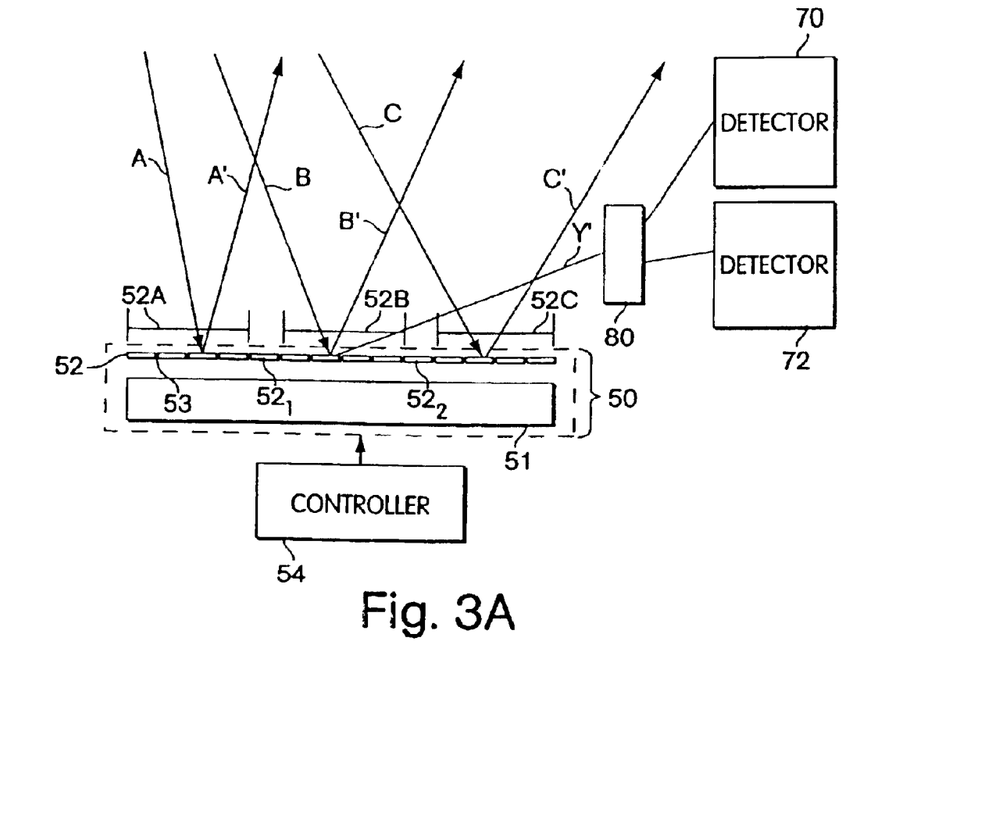
FIG. 3A is a diagram showing a more detailed view of a portion of the apparatus of FIG. 2, according to one aspect of the invention.

According to other aspects of the invention, in order to implement OADM optical processing functions, the diffracting optical element 50 is configured (e.g., grating element 52 in FIG. 3A are positioned) so as to substantially reduce the zeroth-order intensity (i.e., the strength along the main pathway) of a particular optical carriers of the optical signal 20 (i.e., a channel dropping function), or to diffract optical radiation to be added from a separate optimally-positioned input (e.g., optical source 60 located off the main pathway) into the main pathway (i.e., a channel adding function). For example, controller 54 configures optical element 50 to achieve dropping or adding. Optical source 60 may be a light generating device such as a laser or light emitting diode, or may be a light transmitting device such as an optical fiber.

According to still other aspects of the invention, to realize a channel adding function, an optical signal provided by an optical source 60 (modulated to realize the optical carrier to be added, the optical carrier corresponding to a channel to be added) may be optimally positioned with respect to the diffracting optical element 50 so that the optical carrier to be added strikes a pixel of the grating such that a non-zeroth order (e.g., a first order) of the diffracted added optical carrier is directed essentially along the main pathway (i.e., along with the zeroth-orders of diffracted channels A', B', and C' shown in FIG. 2) toward multiplexer 26. In this manner, the added optical carrier can be spatially combined with the other optical carriers by the optical multiplexer 26. The term "pixel" is defined herein below with reference to FIG. 3A. From the foregoing, it may be appreciated that the optical processing apparatus 30 of FIG. 2 provides a versatile optical processing mechanism capable of a number of different functions in a single device.

FIG. 3A is an expanded cross-sectional view of one example of a diffracting optical element 50, according to aspects of the invention. For example, in one embodiment, the diffracting optical element 50 may be constructed and arranged as a controllable diffraction grating, as described in U.S. Pat. No. 5,757,536, entitled "Electrically Programmable Diffraction Grating," U.S. Pat. No. 5,905,571, entitled "Optical Apparatus for Forming Correlation Spectrometers and Optical Processors," and U.S. Pat. No. 6,329,738 B1, entitled "Precision Electrostatic Actuation and Positioning," which was incorporated herein above. U.S. Pat. No. 5,757,536, and U.S. Pat. No. 5,905,571 are hereby incorporated herein by reference.

The aforementioned three patents generally describe several embodiments of a controllable diffraction grating, various fabrication methods for such devices, and some exemplary spectroscopy-related applications using such devices. In one particular example, these patents describe technology that facilitates electrostatic actuation of individually actuated mechanical-beam grating elements of a controllable diffraction grating to achieve programmable optical transfer functions.

As can be seen from the cross-sectional diagram of FIG. 3A, the diffracting optical element 50, according to one aspect of the invention, comprises a number of essentially parallel thin mechanical beams 52, referred to hereinafter as "grating elements." In some embodiments of this aspect, the grating elements 52 may be coated with an appropriate coating (e.g., gold) so as to be optically reflective in a particular wavelength range of interest. Additionally, in yet another aspect, the grating elements may be supported on a substrate 51 in a variety of manners. For example, the grating elements can be supported as disclosed in the aforementioned patents. Further details regarding support of grating elements is given in FIGS. 5A–5B and FIGS. 6A–6B below. Particular support mechanisms are not illustrated in FIG. 3A to avoid obfuscation.

According to yet another aspect of the invention, each grating element 52 of the controllable diffraction grating 50 shown in FIG. 3A is capable of being individually actuated (e.g., by the controller 54) so as to effect some physical change of the grating element with respect to other grating elements of the controllable diffraction grating 50. For example, each grating element 52 may be moved with respect to other grating elements by one or both of translational and rotational displacement of the grating element. In particular, each grating element 52 may be independently displaced in a direction essentially normal to a surface of substrate 51 (i.e., in a vertical direction of the cross-sectional perspective shown in FIG. 3A). According to another aspect of the invention, the grating elements 52 may be electrostatically actuated (e.g., the controller 54 outputs a voltage to an electrode associated with a particular grating element so as to displace grating element 52 in the direction of substrate 51), as discussed in the aforementioned patents and patent application. It should be appreciated, however, that the invention is not limited in this respect, as other actuation mechanisms (e.g., thermal, piezoelectric, magnetic) are possible.

As illustrated in FIG. 3A, according to one aspect of the invention, the different optical signals corresponding to optical carriers A, B, and C of the optical signal 20 are spatially separated (by the optical demultiplexer 22 shown in FIG. 2) such that each optical carrier impinges on a corresponding set of at least two grating elements of the diffracting optical element 50. Each set is herein referred to as a "pixel." The pixels (i.e., their grating elements) are configurable to diffract a corresponding optical carrier. For example, in FIG. 3A, optical carrier A impinges upon a first pixel 52A of four grating elements, optical carrier B impinges upon a second pixel 52B of four grating elements, and optical carrier C impinges upon a third pixel 52C of four grating elements. Although FIG. 3A shows optical carriers A, B, and C only impinging on one grating element of the respective sets, it should be appreciated that this is merely a simplification of the drawing, as each of the optical carriers may actually impinge upon all four of the grating elements in the corresponding pixel.

In the embodiment of FIG. 3A, while four grating elements per pixel are shown for each optical carrier, it should be appreciated that the invention is not limited in this respect, as the number of grating elements included in each pixel may be different according to other embodiments. In particular, as discussed above, the number of grating elements included in each pixel may depend, at least in part, on the dispersion (spatial separation) imparted by the optical demultiplexer 22 shown in FIG. 2, the overall pitch of the grating elements 52 in the diffracting optical element 50, a distance between the optical demultiplexer 22 and the diffracting optical element 50, and the spot size of the optical carrier as projected onto diffracting optical element 50.

According to one aspect of the invention, at least two grating elements are required for each pixel dedicated to a particular channel (or wavelength band) so as to achieve individual and selective diffraction of the optical carrier corresponding to that channel (or wavelength band). In one aspect, the number of grating elements per pixel is chosen to be even, so as to achieve increased diffraction efficiency for a specific channel. Additionally, as illustrated in FIG. 3A, one or more "buffer" grating elements may be designated to separate the respective pixels of grating elements dedicated to diffracting the optical carriers. For example, FIG. 3A indicates a first buffer element $52_1$, between the pixels 52A and 52B, and a second buffer element $52_2$ between the pixels 52B and 52C. Further details on the roles of the buffer grating elements and the number of grating elements employed in general in a given diffracting optical element 50, and design considerations underlying various implementations, are discussed in the patents mentioned above.

In the illustration of FIG. 3A, surfaces of the respective grating elements 52 of the diffracting optical element 50 are shown to lie essentially in the same horizontal plane. This configuration is referred to as an "unactuated" state of the diffracting optical element 50. With the grating elements 52 in these relative positions, most of the radiation from the channels impinging on the diffracting optical element 50 is specularly reflected from the surface of the individual grating elements. However, it should be appreciated that generally there is some loss of radiation due to the periodic presence of lateral gaps 53 between the grating elements 52. While in FIG. 3A, the diffracting optical element 50 typically is designed such that these gaps are small (e.g., about 12% of the total pitch of the grating), in another aspect of the invention, the gaps can be substantially eliminated as described in pending U.S. pat. application Ser. No. 09/975, 169, filed Oct. 11, 2001, entitled "Actuatable Diffractive Optical Processor," which is hereby incorporated by reference.

Figure 3B:
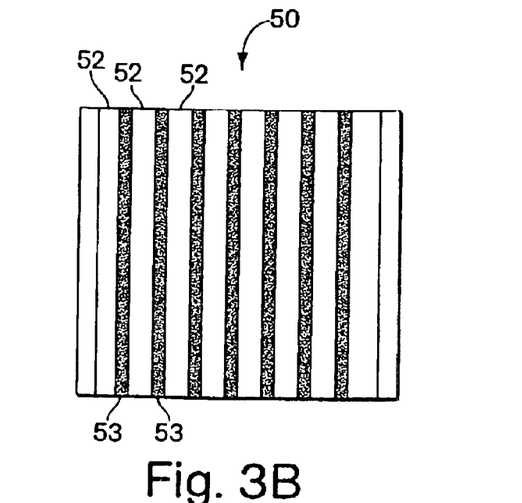
FIG. 3B is a top view of the optical processor of FIG. 3A.

FIG. 3B is a top view of optical processor 50 in FIG. 3A. FIG. 3B illustrates that optical optical processor 50 has a plurality of parallel grating elements 52, each pair of adjacent grating elements being separated by a gap 53.

Referring again to FIG. 3A, in view of the foregoing, a reasonable estimate for the total intensity loss in the main pathway signal due to the diffracting optical element 50 may be given by the percentage of the gaps between the grating elements 52 to the total pitch of the optical element 50. Hence, if the gap constitutes 12% of the pitch, then approximately 22% of the main pathway signal is lost into the gaps. Additionally, in one embodiment, the presence of the gaps diffracts approximately 10% of the radiation impinging on the diffracting optical element 50; accordingly, this diffraction effect due to the gaps increases the total loss due to the gaps in the foregoing example to approximately 22% (corresponding to an insertion loss of approximately 1.11 dB in intensity).

In the embodiment of FIG. 3A, the direction of the diffracted radiation Y' due to the gaps between the grating elements 52 is at an angle to the main pathway radiation. Hence, according to one aspect of this embodiment, the gap-diffracted radiation can be received by a detector 70 for monitoring an intensity of the optical signal being processed. The gap-diffracted radiation may be collected and directed to detector 70 via one or more other optical elements 80. In one embodiment, optical elements 80 may include a dispersive optical element 80 (e.g., similar to the optical demultiplexer 22) so as to achieve greater spatial separation of the gap-diffracted radiation from each of the optical carriers. In this manner, gap-diffracted radiation from each of the optical carriers may be directed to physically distinct detectors (e.g., detectors 70, 72) so as to individually monitor an intensity of optical carriers corresponding to one or more channels (e.g., optical carriers A, B, and C) of the optical signal. According to some aspects of the invention, optical element 80 includes a scanner which includes, for example, a conventional mirror, prism, or acousto-optical device, disposed in a path of the gap-diffracted radiation Y' to steer the gap-diffracted radiation Y' so as to sweep each channel in sequence across a detector 70, thereby providing a periodic sequential monitoring of channel intensity using a single detector.

Figure 4:
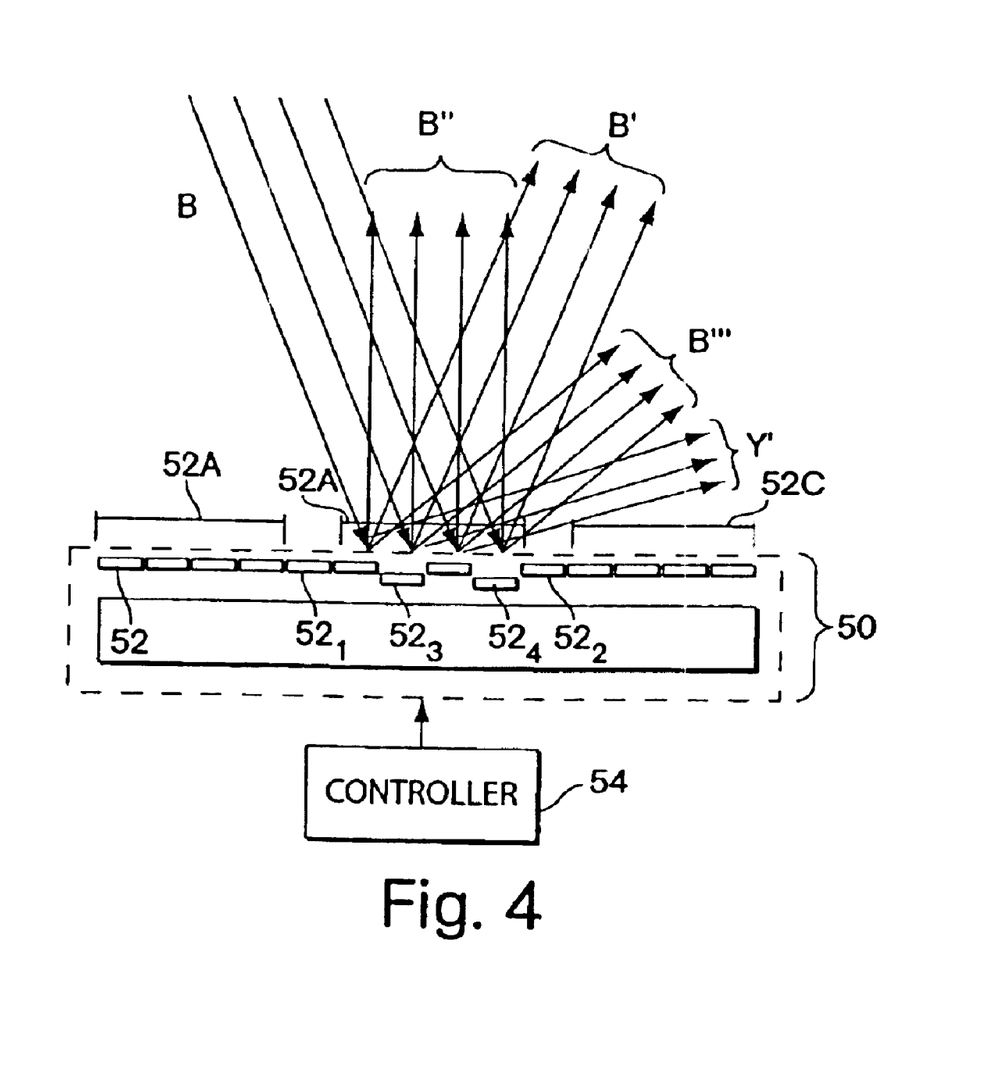
FIG. 4 is a diagram illustrating particular functional aspects of a portion of the apparatus of FIG. 2, according to one aspect of the invention.

FIG. 4 is a diagram similar to the detailed view of FIG. 3, illustrating particular functional aspects of a portion of the apparatus of FIG. 2, according to one embodiment of the invention. In particular, FIG. 4 illustrates the individual actuation of some of the grating elements 52 of the diffracting optical element 50 so as to modify the main pathway (i.e., zeroth-order) intensity of a particular optical carrier (i.e., the optical carrier B) of the optical signal 20; accordingly, the diagram of FIG. 4 represents an "actuated" state of the diffracting optical element 50.

It should be appreciated that while (for purposes of clarity) FIG. 4 only illustrates the optical carrier B and actuation of some of the grating elements of the pixel 52B (i.e., the grating elements $52_3$ and $52_4$) corresponding to the optical carrier B, the following discussion applies equally to actuation of grating elements in other pixels (e.g., the pixels 52A and 52C) to selectively diffract other optical carriers of the optical signal (e.g., the optical carriers A and C). Additionally, it should be appreciated that the particular grating elements shown as actuated in FIG. 4 are selected for purposes of illustration only, and that other elements or combinations of elements in a given pixel may be actuated to selectively diffract a given optical carrier, as discussed further below.

Furthermore, while FIG. 4 only illustrates selective diffraction of the optical carrier B, it should be appreciated that, according to one aspect of the invention, the diffracting optical element 50 shown in FIG. 4 is capable of simultaneously diffracting multiple optical carriers of an optical signal (e.g., two or more of the optical carriers A, B, and C), such that different optical carriers may be simultaneously, independently, and in some cases differently diffracted.

In FIG. 4, the actuation of the grating elements $52_3$ and $52_4$ of the pixel 52B (e.g., via the controller 54) and their resulting vertical displacement creates a local diffraction effect for the optical carrier B, diffracting some of the radiation corresponding to the channel B to the left and right of the main pathway (i.e., some of the optical carrier B radiation is diffracted into non-zeroth orders). In FIG. 4, the main pathway (zeroth-order) of the diffracted optical carrier B is indicated as B', while the other illustrated orders of the selectively diffracted channel B are indicated as B" and B'". Because of this diffraction, the intensity of the zeroth-order B' is reduced; accordingly, the intensity of the zeroth-order B' of the diffracted optical carrier B can be independently and variably controlled via actuation of one or more grating elements of the corresponding pixel 52B. This same process applies similarly to the other optical carriers (e.g., the optical carriers A and C) of the optical signal to be processed.

In view of the foregoing, it may be understood that to achieve the VOA or GEF functions discussed above, the diffracting optical element 50 of FIG. 4 may be employed in the apparatus of FIG. 2, wherein one or more grating elements of a pixel of grating elements corresponding to a specific channel are actuated so as to achieve the desired degree of attenuation of the optical carrier corresponding to that channel. For the VOA function, in which it is desired generally to have all optical carriers of the optical signal uniformly attenuated, this actuation feature permits fine tuning of the transfer functions in ways that cannot be achieved with elements such as Fabry-Perot interferometers. For the GEF function, not only can high-resolution gain-equalization be achieved using the apparatus described above, but additionally the actuation can be adjusted over time (e.g., to compensate for drifts and aging of one or more amplifiers used to amplify the optical signal). Furthermore, for dynamic adjustment of channel attenuation using the apparatus described above, the actuation can be performed in times on the order of one millisecond.

As discussed above, for some applications of an optical processor according to various aspects of the invention, it may not be necessary to achieve full channel-by-channel resolution of the optical signal to be processed. This situation may arise particularly in connection with the VOA function, which requires generally flat transfer functions, independent of wavelength. In such a case, it is not necessary that the optical demultiplexer 22 shown in FIG. 2 achieves full spatial separation of optical carriers corresponding to individual channels of the optical signal. However, it should be appreciated that typically some degree of wavelength dispersion is preferable so that different wavelength bands or sub-bands impinge upon different grating pixels of the diffracting optical element 50 illustrated in FIGS. 3 and 4; in this manner, the diffracting optical element 50 can implement fine tuning of the flatness of the overall zeroth-order (specular) transfer characteristic of wavelength bands or sub-bands on an individual and selective basis.

In the embodiment of FIG. 4, the non-zeroth orders B" and B'" of the diffracted optical carrier B are at different angles with respect to the zeroth-order B' than radiation from the optical carrier B that is diffracted by the gaps between the grating, as discussed above (i.e., the gap-diffracted radiation Y' for the optical carrier B is at about twice the angle to the main pathway as the angle shown for the non-zeroth orders B" and B'" in FIG. 4). Hence, according to one embodiment, the non-zeroth orders B" and B'" can be collected and directed to another output port of the optical processing apparatus (e.g., for a channel dropping and redirecting function) or to an optical detector (e.g., for an individual channel monitoring function) without interference from the gap-diffracted radiation for the optical carrier B.

Additionally, in one aspect of the embodiment of FIG. 4, to achieve a channel dropping function (e.g., to significantly reduce the intensity of the zeroth-order B' such that the optical carrier B is effectively or substantially removed from the processed optical signal 20' (i.e., removed from the main pathway) shown in FIG. 2), appropriate grating elements of the pixel 52B may be displaced by ¼ of the wavelength of the optical carrier B (i.e., when alternate grating elements are displaced by ¼ wavelength, essentially all of the radiation in the channel is diffracted). Typically, however, in this case, 50% of the diffracted radiation is directed to the order B", and approximately 50% is directed to the order B'".

According to another embodiment of the invention, the grating elements of a pixel, e.g., pixel 52B, may be particularly actuated such that the diffracted radiation is unequally divided among the non-zeroth orders, e.g., B" and B'", of the diffracted radiation; that is the optical carrier may be asymmetrically diffracted by positioning the grating elements according to any known means of configuring grating elements to achieve assymetric diffraction. Methods of obtaining an asymmetric diffraction pattern in an actuatable diffractive optical element are described in U.S. Pat. No. 6,268,952 B1, issued Jul. 31, 2001, to Godil, et al, the substance of which is hereby incorporated by reference.

The foregoing discussion applies similarly to removing or redirecting other optical carriers corresponding to other channels (e.g., the optical carriers A and C) of the optical signal to be processed. Thus, it should be appreciated that the diffracting optical element 50 of FIG. 4 may be used to drop a given optical carrier of the optical signal from the main pathway and direct the channel radiation to another path, with an ideal loss of approximately 2.11 dB (1.11 dB for the gap loss, 1 dB for the diffraction loss). At least one method of analysis that may be utilized to determine relative displacements of particular grating elements so as to achieve asymmetric diffraction of a given optical carrier is discussed in U.S. Pat. No. 5,905,571, incorporated herein by reference.

As discussed above, according to embodiments of various aspects of the invention, the diffracting optical element 50 shown generally in FIG. 2 may be implemented by a variety of alternative structures that use beam-like grating elements suspended from supports over a substrate and actuated by electrical, mechanical (e.g., piezoelectric), or thermal means. In one embodiment according to some aspects of the invention, the diffracting optical element 50 more specifically shown in FIGS. 3 and 4 may be realized using procedures outlined in U.S. Pat. No. 6,329,738 B1.

Some noteworthy features of diffracting optical elements realized in this manner include, but are not limited to, grating elements that remain flat and parallel to the substrate throughout actuation, small lateral gaps between grating elements (and, hence, low specular reflection gap loss), and undesirable electrostatic pull-in being completely prevented throughout desired actuation ranges. Furthermore, by using a "tiling" procedure for constructing long grating elements as set forth in the aforementioned patent application, the shape of the optical surface of the diffracting optical element can be designed to match the optical footprint of the demultiplexed optical signal that impinges on the diffracting optical element. Moreover, by optimizing the design of a repeat unit used to create complete grating elements, the maximum quarter-wavelength travel required for any of the telecommunications optical bands (e.g., 1.3 micrometers, 1.5 micrometers) can be achieved at voltages below 50 V, which is in a range well within the capabilities of commercially available application-specific-integrated circuits.

Based on the various architectures described in the aforementioned patent application, below are provided some exemplary specifications for realizing a diffracting optical element according to some aspects of the invention. It should be appreciated that the specifications provided below are for purposes of illustration only, and that the invention is not limited to employing a diffracting optical element having these specifications. Accordingly, one example of a repeat unit design for a diffracting optical element employs polysilicon grating elements having a length of approximately 300–400 micrometers and having a continuous actuation electrode beneath each grating element. Furthermore, using an approximately two micrometer vertical gap between the electrode and the lower beam, an approximately 1 micrometer thickness of the lower beam, and an approximately 1 micrometer gap between the lower beam and the upper reflective beam (coated with gold), the device is capable of up to approximately 1 micrometer of continuously adjustable vertical travel of each grating element with actuation voltages for each element below 50 Volts. Additionally, if a width of approximately 3.5 micrometers is used for the upper beam and a gap of approximately 0.5 micrometers, an 87.5% fill factor is achieved for a total loss of 23.4% due to the gaps between grating elements (including the gap diffraction). This corresponds to an unactuated insertion loss attributable to the diffracting optical element of approximately 1.11 dB. If loss due to the optical demultiplexer 22, which generally is on the order of 1 dB, and an additional allowance for losses due to the optical multiplexer 26 (also estimated at approximately 1 dB), is added to the insertion loss for the diffracting optical element, an overall insertion loss of the optical processing apparatus shown in FIG. 2 is estimated to be approximately 2.65 dB, with a reasonable expectation of achieving insertion loss in the 3.11 dB to 4 dB range.

Using the foregoing specifications and assigning four grating elements per channel plus one grating element as a buffer between channels (as illustrated in the embodiment of FIG. 4), the pitch required per channel is 5×4 micrometers or 20 micrometers. Therefore, a width of the optical area of a diffracting optical element similar to that shown in FIG. 4, specifically designed to control 256 channels of an optical signal, would be approximately 5 millimeters, well within the capabilities of standard silicon integrated circuit fabrication methods. Alternatively, if a particular design were to include eight grating elements per channel plus one buffer element, the width of the device would still be less than 1 cm, smaller than a standard modem integrated circuit die.

Figure 5A:
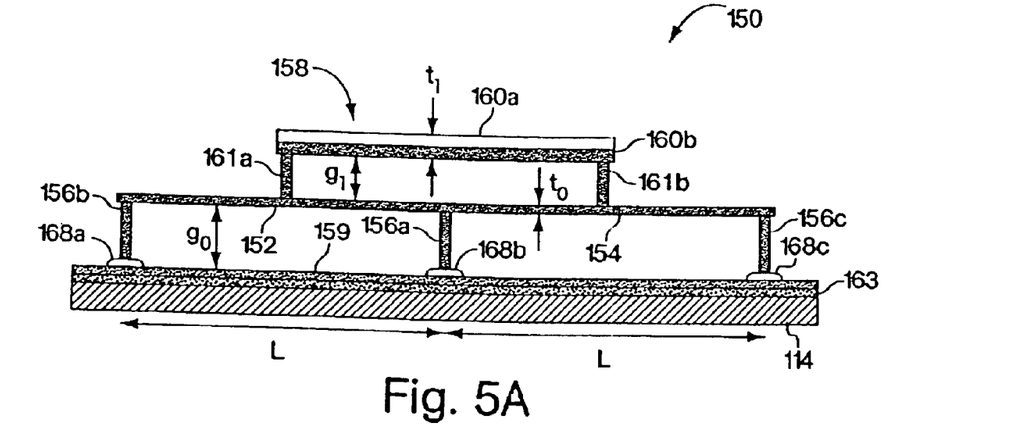
FIGS. 5A–5B are schematic side views of support structures for supporting grating elements according to some aspects of the present invention.
Figure 5B:
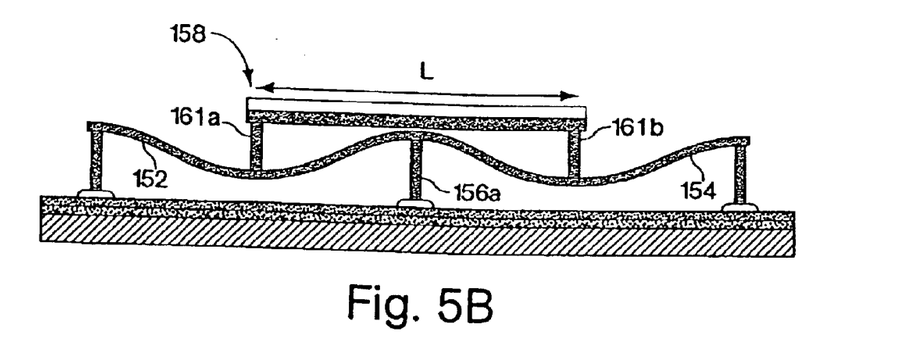

FIGS. 5A–5B are schematic cross-sectional side views of support structures for supporting grating elements according to some aspects or embodiments of optical processors according to the present invention. For example support structures 150 can be use to support grating elements 52 of FIG. 3A above.

As shown in the figure, there is provided on a substrate 114 two actuating beams 152, 154, each of a common length, L, and each of a common thickness, $t_0$; however support structures having actuating beams 152 of differing lengths and/or thicknesses are within the scope of aspects of this invention. The two actuating beams are of an electrically conducting material (e.g., doped silicon) and define central, conducting actuation regions that are supported over a substrate 114 by outer actuation support regions, here provided as support posts 156a, 156b, 156c. The central support post, 156a, is shared by the two beams, but such is not required by the invention. With this support, an actuating gap, $g_0$, is defined between the actuating beams and the substrate.

An upper, auxiliary beam 158, including one or more layers 160a (e.g., grating element 52 in FIG. 3A), 160b, of selected material that can be electrically conducting or insulating as-desired, is provided to define a central deflection region that is supported over the actuating beams 152, 154 by auxiliary support regions, here posts 161a, 161b. Posts 161a, 161b, in turn are supported by actuating beams 152, 154 such that the auxiliary beam is supported over substrate 114 by actuating beams 152, 154. The auxiliary beam 156 is of a total selected thickness, $t_1$, and of a length, L, equal to the actuation beams' lengths. The auxiliary beam is suspended over the actuating beams by an auxiliary gap, $g_1$. Note that with this actuator configuration, the actuating beams' materials, lengths, thicknesses, supports, and lower actuating gap can be specified distinctly from the material, length, thickness, supports, and gap of the auxiliary beam. As a result, the operational characteristics of the actuator can be finely controlled, as described below and in greater detail in co-pending application Ser. No. 10/015,732, incorporated by reference herein above.

A continuous, electrically conducting electrode layer 159 is provided on the surface of the substrate 114, isolated from the substrate by an insulating layer 163. The actuating beam supports each can include an insulating support base 168a, 168b, 168c, to electrically isolate the supports from the continuous electrically conducting layer 161 if the supports are formed of an electrically conducting material. If the actuating beam supports are formed of an insulating, rather than conducting material, such is not required.

Referring to FIG. 5B, when an actuating voltage, V, is applied between the actuating beams and the continuous conducting layer below the beams, with the actuating beams set at electrical ground, the central region of each actuating beam acts as an actuation region and is displaced toward the substrate. When the actuating beams have been actuated such that their actuation regions are displaced downward by an amount equal to the auxiliary gap, $g_1$, then the deflection region of the auxiliary beam 158 comes to rest on the shared actuation beam support post 156a.

Planarity is maintained along the length of the deflection region of the upper auxiliary beam during this downward displacement of the actuating beams because no part of the auxiliary beam is electrostatically actuated, and because the support posts of the auxiliary beam move downward in unison on the actuation beams. The auxiliary beam itself functions as a planar surface to be moved. Optionally, the auxiliary beam 158 and actuating beams 152, 154 can be coupled to a frame (not shown), and upon downward displacement of the actuating beams, auxiliary beam 158 is maintained with substantially planarity as described in copending U.S. patent application Ser. No. 09/975,169, entitled "Actuatable Optical Processor" by Deutsch et al. U.S. patent application Ser. No. 09/975,169 is hereby incorporated by reference.

As discussed above with reference to FIG. 4, a channel dropping function can be achieved by displacing appropriate grating elements by ¼ of the wavelength of the optical carrier B (i.e., when alternate grating elements are displaced by ¼ wavelength, essentially all of the radiation in the channel is diffracted out of the main pathway and the optical carrier in the main pathway is substantially fully attenuated). A benefit of improved planarity results from the fact that improving planarity across the entire portion of a grating element onto which a projected optical carrier impinges the grating element allows the ¼ of a wavelength displacement to be more nearly maintained across the entire portion of a grating element onto which a projected optical carrier impinges, thus resulting in greater attenuation of the optical carrier to be dropped.

Figure 6A:
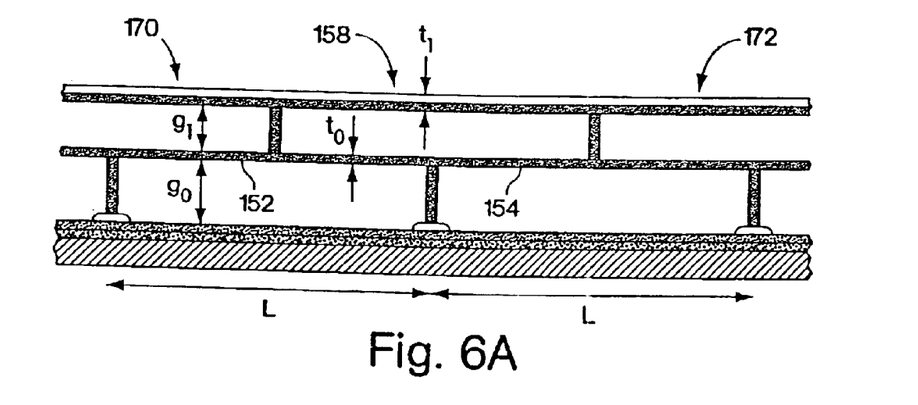
FIGS. 6A–6B are schematic side-view diagrams of an example configuration wherein the auxiliary beam is repeated.
Figure 6B:
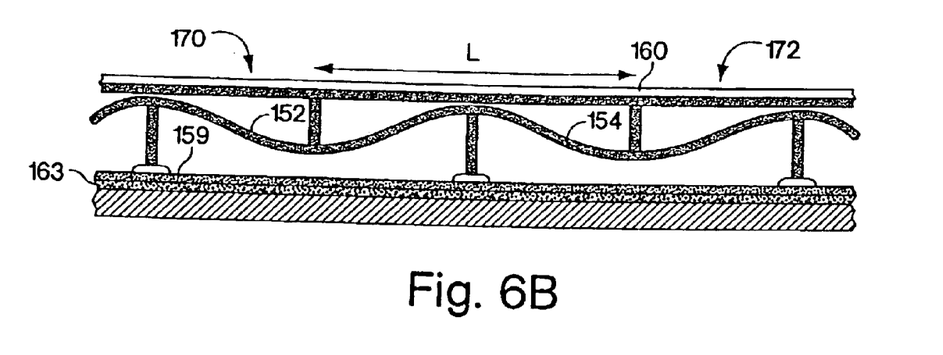

FIGS. 6A–6B are schematic cross-sectional side-view diagrams of an example configuration wherein the auxiliary beam 158 is repeated with adjacent beams 170, 172 and so on, to form a row of auxiliary beams all supported atop a corresponding row of actuation beams. With actuating electrode configuration and operation like that of the structure of FIG. 6B, deflection of the row of lower actuation beams results in planar movement of the row of upper auxiliary beams during the first operational regime characteristic of the structure. As discussed below, this arrangement for providing planar motion can be extended to a wide range of electrostatically actuated structures.

Figure 7:
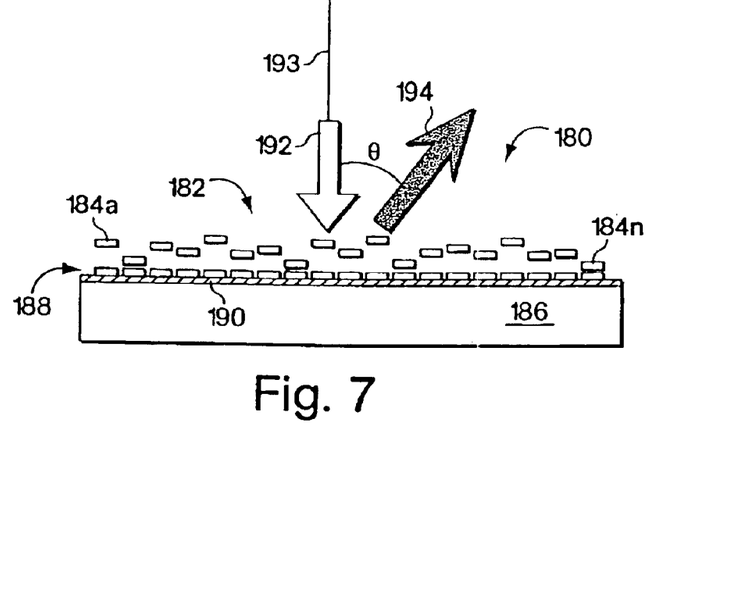
FIG. 7 is a side view of a electrostatic optical processor according to some aspects of the invention.

FIG. 7 is a side view of an electrostatic optical processor according to aspects of the present invention. As shown in the figure, the diffraction grating 180 includes an array 182 of a number, n, of flat mirrors (i.e., grating elements) 184a–184n, that are suspended over a substrate 186.

In this example embodiment, the mirrors are electrically conducting and their upper surface is provided with an optically reflecting coating. An actuating electrode array 188 is provided on the substrate, with one electrode or a specified set of electrodes designated for a corresponding suspended mirror. The actuating electrodes are electrically isolated from the substrate by an insulating layer or layers 190 and each can be individually addressed. This enables application of a distinct actuation voltage between each mirror and corresponding actuating electrode, in the manner described previously. With this arrangement, the height of each mirror can be individually electrostatically controlled to enable distinct analog positioning of each of the mirrors.

When light 192 from a broadband source (i.e., a source having a plurality of wavelengths) is directed onto the array of mirrors (e.g., along a main pathway 193), the heights of the mirrors control the optical path length of light reflected from the mirrors. Specifically, the path of a light ray reflected from the grating depends on the height of that mirror from which the ray was reflected. This effect results in a phase shift between reflected light rays, and leads to the formation of a diffracted light beam 194. Collection of this diffracted light beam 194 at an angle, θ, corresponding to the selected mirror heights, enables detection and analysis of wavelength-specific optical information. Thus, the diffraction grating 180 functions as an electrically-programmable optical filter, where the heights of the mirrors implement an optical diffraction transfer function. Accordingly, real time electrostatic analog positioning of the grating mirror heights enables adjustment and modulation of the optical transfer function of the grating.

Figure 8:
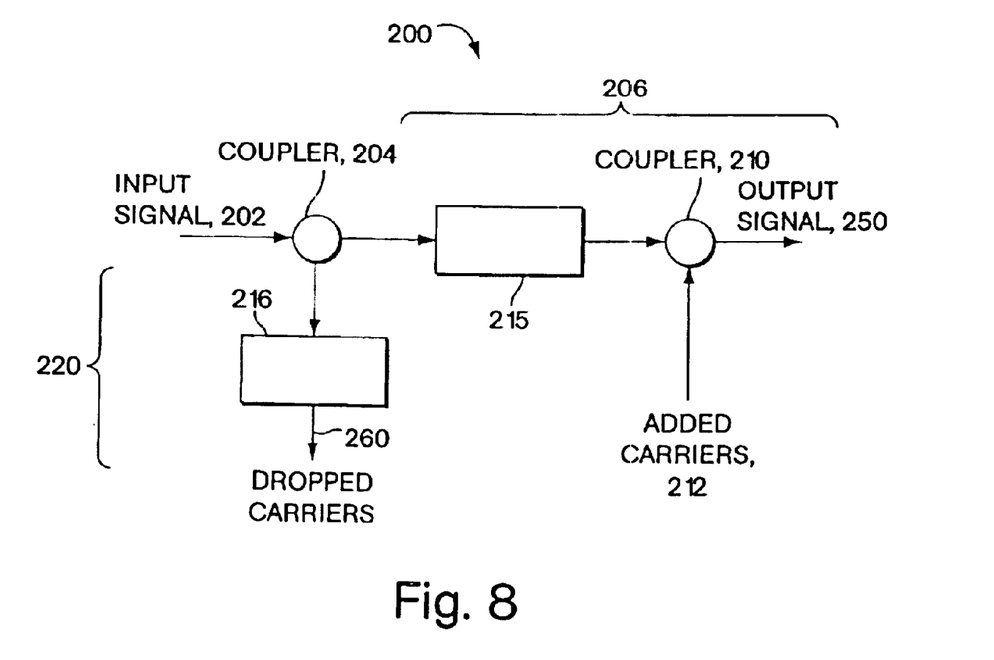
FIG. 8 is a schematic diagram of communications system, commonly referred to as a broadcast-and-select OADM multiplexer system, illustrating aspects of the present invention.

FIG. 8 is a schematic diagram of communications system 200, commonly referred to as a broadcast-and-select OADM multiplexer system, illustrating aspects of the present invention. Communications system 200 illustrates one use of optical processors providing improved planarity, such as optical processors using the support structure described with reference to FIGS. 5A–B and 6A–B. In FIG. 8, optical processors providing improved planarity are used as channel droppers 215, 216 (also referred to as channel blockers).

Optical processor 200 receives an input signal 202 having a plurality of optical carriers (e.g., a WDM signal having 80 optical carriers). Coupler 204 (e.g., a 3 dB coupler) directs a portion of each optical carrier comprising the input signal 202 down each of a first branch 210 and a second branch 220. Channel dropper 215 blocks a first set of one or more of the optical carriers and transmits the remaining optical carriers (i.e., a second set). A coupler 206 (e.g., a 3 dB coupler) allows one or more optical carrier 212 to be added to the first set of carriers to form an output signal 250. The added carriers may correspond to one or more wavelengths of light of the carriers blocked by channel dropper 215.

In communication system 200, according to some aspects of the invention, channel dropper 216 blocks the optical carriers corresponding to the first set of one or more of the optical carriers and transmits the remaining optical carriers (i.e., the second set). The transmitted second set is commonly referred to as the dropped carriers of communication system 200. The dropped carriers are available for further processing at the output 260 of second branch 220.

Although the system above was described having two mutually exclusive sets of optical carriers at outputs 250, 260, outputs may have one or more optical carriers in common. Also, although in the above discussion droppers 215 and 216 were described as blocking optical carriers of input signal 202, it should be understood that droppers 215 and 216 may function to block (i.e., attenuate) empty channels (i.e., channels not having a corresponding optical carrier), thus removing a potential source of amplified spontaneous emission (ASE).

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method of redirecting light from a main pathway using a diffracting optical element having a plurality of reflective grating elements, comprising:

supporting a plurality of actuating beams over a substrate, each of the plurality of actuating beams forming a corresponding actuation gap relative to the substrate, the plurality of actuating beams forming a plurality of rows, each row including a corresponding at least two of the plurality of actuating beams;

supporting each of the plurality of grating elements over a corresponding one of the plurality of rows of actuating beams to form a corresponding auxiliary gap therebetween;

directing a beam of light along the main pathway and onto a portion of each of the plurality of grating elements, the beam having at least light of a first wavelength and light of a second wavelength; and positioning at least one of the plurality of grating elements relative to the substrate by actuating the at least two of the actuating beams corresponding to at least one of the plurality of rows of actuating beams, the positioning causing at least a portion of one of the light of a first wavelength and the light of a second wavelength to be diffracted out of the main pathway, whereby the planarity of the at least one of the plurality of grating elements is maintained over the portion of the at least one of the plurality of grating elements onto which the beam of light is directed.

2. The method of claim 1 wherein the light of a first wavelength and the light of a second wavelength are from a broadband source.

3. The method of claim 1 further comprising spatially separating the light of a first wavelength and the light of a second wavelength prior to directing the beam of light onto the plurality of grating elements.

4. The method of claim 3 wherein the light of a first wavelength is an optical carrier in a DWDM signal.

5. The method of claim 4 wherein the optical carrier is dropped.

6. The method of claim 4 wherein the optical carrier is asymmetrically diffracted.

7. The method of claim 4 wherein the method is used to block optical carriers in an OADM multiplexer system.

8. A method of processing a first optical carrier of a wavelength-division multiplexed signal using a diffracting optical element having a plurality of reflective grating elements and a main pathway, comprising:

supporting a plurality of actuating beams over a substrate, each of the plurality of actuating beams forming a corresponding actuation gap relative to the substrate, the plurality of actuating beams forming a plurality of rows, each row including a corresponding at least two of the plurality of actuating beams;

supporting each of the plurality of grating elements over a corresponding one of the plurality of rows of actuating beams to form a corresponding auxiliary gap therebetween;

directing the first optical carrier along the main pathway and onto a portion of each of the plurality of grating elements; and positioning at least one of the plurality of grating elements relative to the Substrate by actuating the at least two of the actuating beams corresponding to at least one of the plurality of rows of actuating beams, the positioning modifying the optical strength of the first optical carrier along the main pathway, whereby the planarity of the at least one of the plurality of grating elements is maintained over the portion of the at least one of the plurality of grating elements onto which the beam of light is directed.

9. The method of claim 8 further comprising spatially separating the first optical carrier from a second optical carrier prior to the directing the first optical carrier onto the plurality of grating elements.

10. The method of claim 9 wherein the positioning causes the first optical carrier to be dropped.

11. The method of claim 9 wherein the first optical carrier is asymmetrically diffracted.

12. The method of claim 9 wherein the method is used to block optical carriers in an OADM multiplexer system.

13. An optical processing apparatus comprising:
(A) an optical source to produce a beam having light of a first wavelength and light of a second wavelength;
(B) a diffracting optical element having a main pathway, arranged to receive the beam of light along a main pathway, the diffracting optical element having,
  (i) a plurality of conductive actuating beams each supported over a substrate by a corresponding at least two actuation beam support posts, each of the plurality of actuating beams forming an actuation gap relative to the substrate, the plurality of conductive actuating beams arranged to form a plurality of rows of actuating beams, each row of actuating beams including at least two of the plurality of actuating beams,
  (ii) a plurality of grating elements arranged to receive the beam of light, each of the plurality of grating elements supported over a corresponding one of the plurality of rows of actuating beams by a corresponding at least two auxiliary beam support post, the corresponding at least two auxiliary beam support posts arranged to form an auxiliary gap between one of the plurality of grating elements and the corresponding one of a plurality of rows of actuating beams, the auxiliary beam posts located such that upon actuation of the actuating beams corresponding to a row of actuating beams in the direction of the substrate, the corresponding grating element is displaced in the direction of the substrate and planarity of the grating element is maintained, and
  (iii) at least one electrode disposed on the substrate;
(B) a controller adapted to establish a voltage between the at least one electrode and the at least two actuating beams corresponding to one of the plurality of the plurality of rows of actuating beams, in a manner such that upon establishment of the voltage, at least a portion of one of the light of a first wavelength and the light of a second wavelength is diffracted out of the main pathway.

14. The optical processing apparatus of claim 13 wherein the optical source is an optical fiber.

15. The optical processing apparatus of claim 13 further comprising a demultiplexer optically coupled to the optical source to achieve spatial separation of the light of a first wavelength and the light of a second wavelength and to project the light of a first wavelength and the light of a second wavelength onto the diffracting optical element.

16. The optical processing apparatus of claim 13 wherein the light of a first wavelength and the light of a second wavelength correspond to a first optical carrier and a second optical carrier in a WDM signal, respectively.

17. The optical processing apparatus of claim 13 wherein the controller is adapted to drop one of the first optical carrier and second optical carrier.

* * * * *